United States Patent
Okumura et al.

(10) Patent No.: US 12,537,365 B2
(45) Date of Patent: Jan. 27, 2026

(54) MULTI-BEAM SEMICONDUCTOR LASER DEVICE AND METHOD OF MANUFACTURING THE SAME

(71) Applicant: Ushio Denki Kabushiki Kaisha, Tokyo (JP)

(72) Inventors: Tadashi Okumura, Tokyo (JP); Shigeta Sakai, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 559 days.

(21) Appl. No.: 18/078,972

(22) Filed: Dec. 11, 2022

(65) Prior Publication Data

US 2023/0198228 A1    Jun. 22, 2023

(30) Foreign Application Priority Data

Dec. 21, 2021    (JP) ................. 2021-207301

(51) Int. Cl.
*H01S 5/00*      (2006.01)
*H01S 5/02*      (2006.01)
(Continued)

(52) U.S. Cl.
CPC .............. *H01S 5/22* (2013.01); *H01S 5/0206* (2013.01); *H01S 5/0207* (2013.01);
(Continued)

(58) Field of Classification Search
CPC ........ H01S 5/22; H01S 5/0206; H01S 5/0207; H01S 5/02461; H01S 5/2086;
(Continued)

(56) References Cited

U.S. PATENT DOCUMENTS

| 2009/0207873 A1* | 8/2009 | Jansen ............... H01S 5/18305 |
| | | 372/50.12 |
| 2017/0098919 A1* | 4/2017 | Lauer .................... H01S 5/2018 |
| 2020/0227892 A1 | 7/2020 | Yudin et al. |

FOREIGN PATENT DOCUMENTS

| JP | S61-185993 A | 8/1986 |
| JP | H04-364084 A | 12/1992 |

(Continued)

OTHER PUBLICATIONS

Japanese Office Action mailed on Jun. 3, 2025 to JP Patent Application No. 2021-207301, from which priority is claimed and which corresponds to the current U.S. Appl. No. 18/078,972, with English Translation.

F. Koyama et al., "Two-dimensional_multiwavelength_surface emitting laser arrays fabricated by nonplanar MOCVD," Electron Lett., vol. 30, No. 23, pp. 1947-1947, Nov. 1994.

(Continued)

*Primary Examiner* — Kinam Park

(74) *Attorney, Agent, or Firm* — Yoshida & Associates LLC; Kenichiro Yoshida

(57) ABSTRACT

An edge-emitting multi-beam semiconductor laser device includes a layered structure including a substrate, an n-type cladding layer, a light-emitting layer, and a p-type cladding layer. The layered structure has m regions (m≥2) that are adjacent in a first direction, and a sum of a height of the substrate and a height of the first conductive cladding layer is different in each of the m regions, n laser resonators (2≤n≤m) each having a ridge stripe structure extending in a second direction orthogonal to the first direction are formed in the n regions among the m regions, and at least two of the n laser resonators have different oscillation wavelengths among the n laser resonators.

19 Claims, 10 Drawing Sheets

(51) Int. Cl.

| | |
|---|---|
| *H01S 5/024* | (2006.01) |
| *H01S 5/20* | (2006.01) |
| *H01S 5/22* | (2006.01) |
| *H01S 5/30* | (2006.01) |
| *H01S 5/343* | (2006.01) |
| *H01S 5/40* | (2006.01) |
| H01S 5/026 | (2006.01) |
| H01S 5/32 | (2006.01) |

(52) U.S. Cl.
CPC ........ *H01S 5/02461* (2013.01); *H01S 5/2086* (2013.01); *H01S 5/3013* (2013.01); *H01S 5/34306* (2013.01); *H01S 5/40* (2013.01); *H01S 5/4031* (2013.01); *H01S 5/4087* (2013.01); *H01S 5/026* (2013.01); *H01S 5/3213* (2013.01)

(58) Field of Classification Search
CPC ...... H01S 5/3013; H01S 5/34306; H01S 5/40; H01S 5/4031; H01S 5/4087; H01S 5/026; H01S 5/3213
See application file for complete search history.

(56) References Cited

FOREIGN PATENT DOCUMENTS

| | | |
|---|---|---|
| JP | 2001-44561 | 2/2001 |
| JP | 2003-017808 A | 1/2003 |
| JP | 2004-288723 A | 10/2004 |
| JP | 4501359 B2 | 12/2004 |
| JP | 2005-191488 A | 7/2005 |
| JP | 2008-91759 A | 4/2008 |
| JP | 2011-210885 A | 10/2011 |
| JP | 2020-113755 A | 7/2020 |

OTHER PUBLICATIONS

Masakazu Arai et al., "Multiple-Wavelength GaInAs—GaAs Vertical Cavity Surface Emitting Laser Array With Extended Wavelength Span," IEEE Journal of Selected Topics in Quantum Electronics, vol. 9, No. 5, pp. 1367-1373, Sep./Oct. 2003.

Akihiro Onomura et al., "Densely Integrated Multiple-Wavelength Vertical-Cavity Surfacee-Emitting Laser Array," Japanese Journal of Applied Physics, vol. 42, No. 5B, pp L529-L531, 2003.

Office Action Mailed On Nov. 11, 2025 For Japanese Application 2 0 2 1-2 0 7 3 0 1 , From Which the Current U.S. Appl. No. 17/613,370 Take Priority.

* cited by examiner

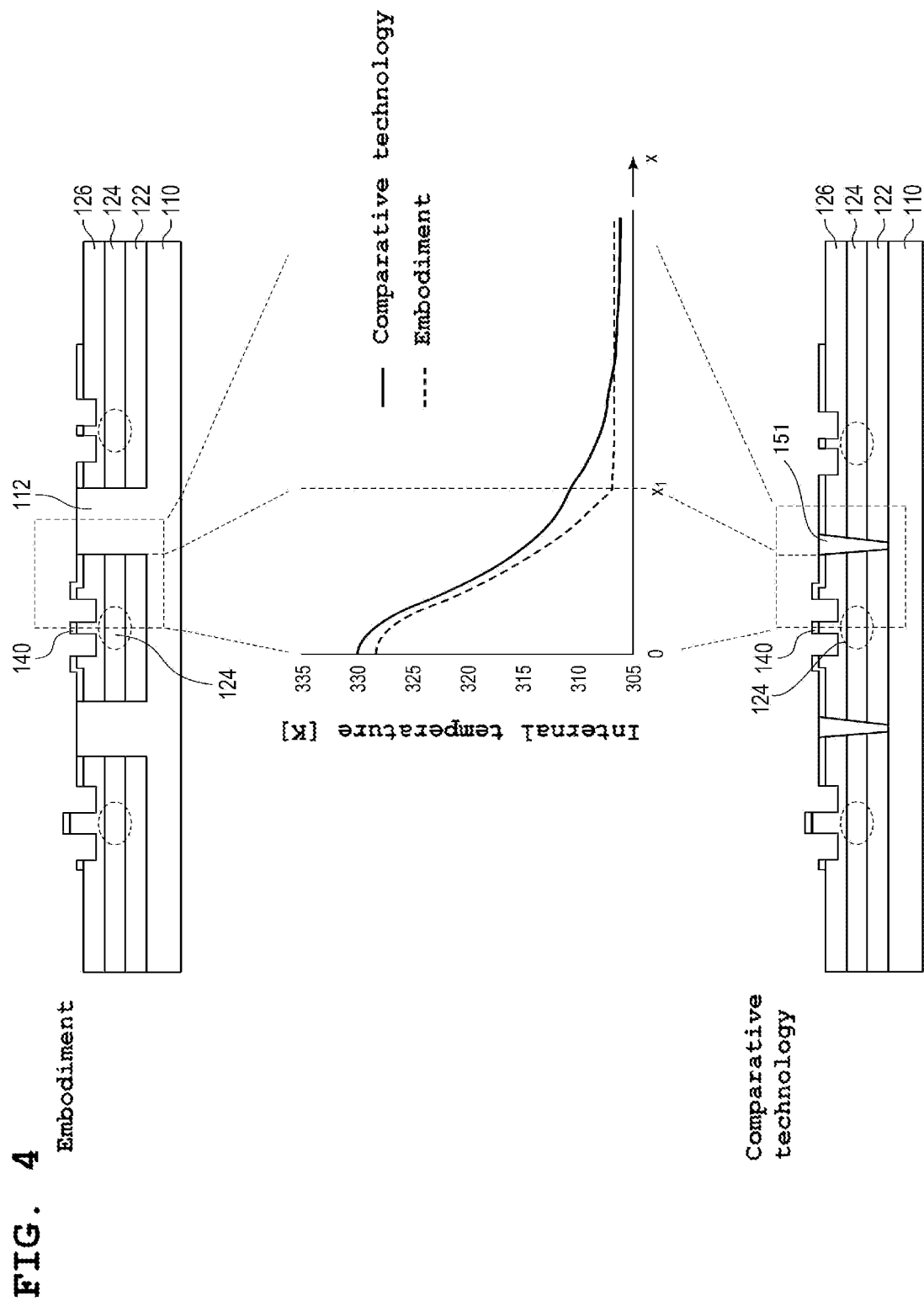

MULTI-BEAM SEMICONDUCTOR LASER DEVICE AND METHOD OF MANUFACTURING THE SAME

CROSS-REFERENCE TO RELATED APPLICATION(S)

This application claims priority from Japanese Patent Application No. 2021-207301 filed on Dec. 21, 2021. The entire teachings of the above application are incorporated herein by reference.

BACKGROUND

Technical Field

The present disclosure relates to a multi-beam semiconductor laser device.

Description of the Related Art

As a high-power edge-emitting laser, Patent Literature 1 proposes a multi-beam semiconductor laser in which a plurality of ridge stripe laser resonators is monolithically integrated.

Patent Literature 1: JP 4501359

Non-patent Literature 1: Two-dimensional multiwavelength surface emitting laser arrays fabricated by nonplanar MOCVD (Electronics Letters, Vol. 30, No. 23 pp. 1947-1948, November 1994)

Non-patent Literature 2: Multiple-Wavelength GaInAs—GaAs Vertical Cavity Surface Emitting Laser Array With Extended Wavelength Span (IEEE Journal of Selected Topics in Quantum Electronics, Vol. 9, No. 5, September/October 2003)

Non-patent Literature 3: Densely Integrated Multiple-Wavelength Vertical-Cavity Surface-Emitting Laser Array (Japanese Journal of Applied Physics, Vol. 42, No. 5B, May 2003)

Problem 1

When multi-beam semiconductor lasers are used as light sources for displays, etc., the multi-beam having the same wavelength of their beams causes interference between the beams, which in turn causes an undesirable intensity distribution (interference pattern) to appear in the far-field pattern (FFP), lowering beam quality. To solve the problem of this beam quality, the oscillation wavelengths of multiple channels are necessary to be intentionally shifted.

An edge-emitting laser includes a layered structure of a first conductive cladding layer, a light-emitting layer, and a second conductive cladding layer; and the oscillation wavelength of the laser resonator is mainly determined by the size of the light-emitting layer and the composition of the light-emitting layer. Hence, in order to monolithically form a plurality of laser resonators with different oscillation wavelengths, it is necessary to undergo a selective growth per resonator or repeat a regrow process.

A selective growth is difficult to apply to mixed materials with high Al composition, such as AlGaInP. Specifically, high Al composition exhibits low selectivity, thus posing a problem that polycrystals are likely to be deposited on the selective mask. In contrast, employing a regrowth process unavoidably leads to an increase in cost.

Non-patent Literatures 1 to 3 propose several techniques for wavelength shifting; however, all of them are related to vertical cavity surface emitting lasers and are not applicable to edge-emitting lasers.

Problem 2

In multi-beam semiconductor laser devices, light leakage between adjacent channels (optical crosstalk) adversely affects beam quality. Patent literature 1 proposes a technology that provides a separation groove in order to shield the leakage of light between adjacent channels.

The separation groove can suppress optical crosstalk; however, it prevents lateral heat conduction in exchange for the suppression, making heat readily accumulate in the emitter. Since the output characteristic (luminous efficiency) of semiconductor lasers decreases with increasing their temperature, the separation groove can be a cause of variation in output characteristics between channels.

SUMMARY

An aspect of the present disclosure is made in such circumstances, and one of the exemplary objects of the present disclosure is to provide a multi-beam semiconductor laser device and a method of manufacturing thereof capable of solving at least one of the above-mentioned problems.

One aspect of the present disclosure relates to an edge-emitting multi-beam semiconductor laser device. The multi-beam semiconductor laser device includes a layered structure including a substrate, a first conductive cladding layer, a light-emitting layer, and a second conductive cladding layer. The layered structure has m regions ($m \geq 2$) that are adjacent in a first direction, and a sum of a height of the substrate and a height of the first conductive cladding layer is different in each of the m regions. In addition, n laser resonators ($2 \leq n \leq m$) each having a ridge stripe structure extending in a second direction orthogonal to the first direction are formed in the n regions among the m regions, and at least two of the n laser resonators have different oscillation wavelengths among the n laser resonators.

Another aspect of the present disclosure relates to a method of manufacturing an edge-emitting multi-beam semiconductor laser device. This manufacturing method involves forming a base structure including a substrate and a first conductive cladding layer; the base structure having a different thickness in each of m regions ($m \geq 2$) adjacent to each other in the first direction, forming a light-emitting layer and a second conductive cladding layer on the base structure, and forming n laser resonators each having a ridge stripe structure extending in a second direction orthogonal to the first direction in n regions ($2 \leq n \leq m$) of the m regions.

Note that any combination of the above components, and any mutual substitution of the components and expressions of the present disclosure among methods, devices, systems, etc., are also valid as an aspect of the present disclosure.

An aspect of the present disclosure is capable of solving at least one of the above-mentioned problems.

BRIEF DESCRIPTION OF DRAWINGS

FIG. 4 is a view illustrating the improvement in heat dissipation properties in the multi-beam semiconductor laser device in FIG. 2.

DETAILED DESCRIPTION OF THE EMBODIMENTS

Overview of the Embodiments

Figure 1:
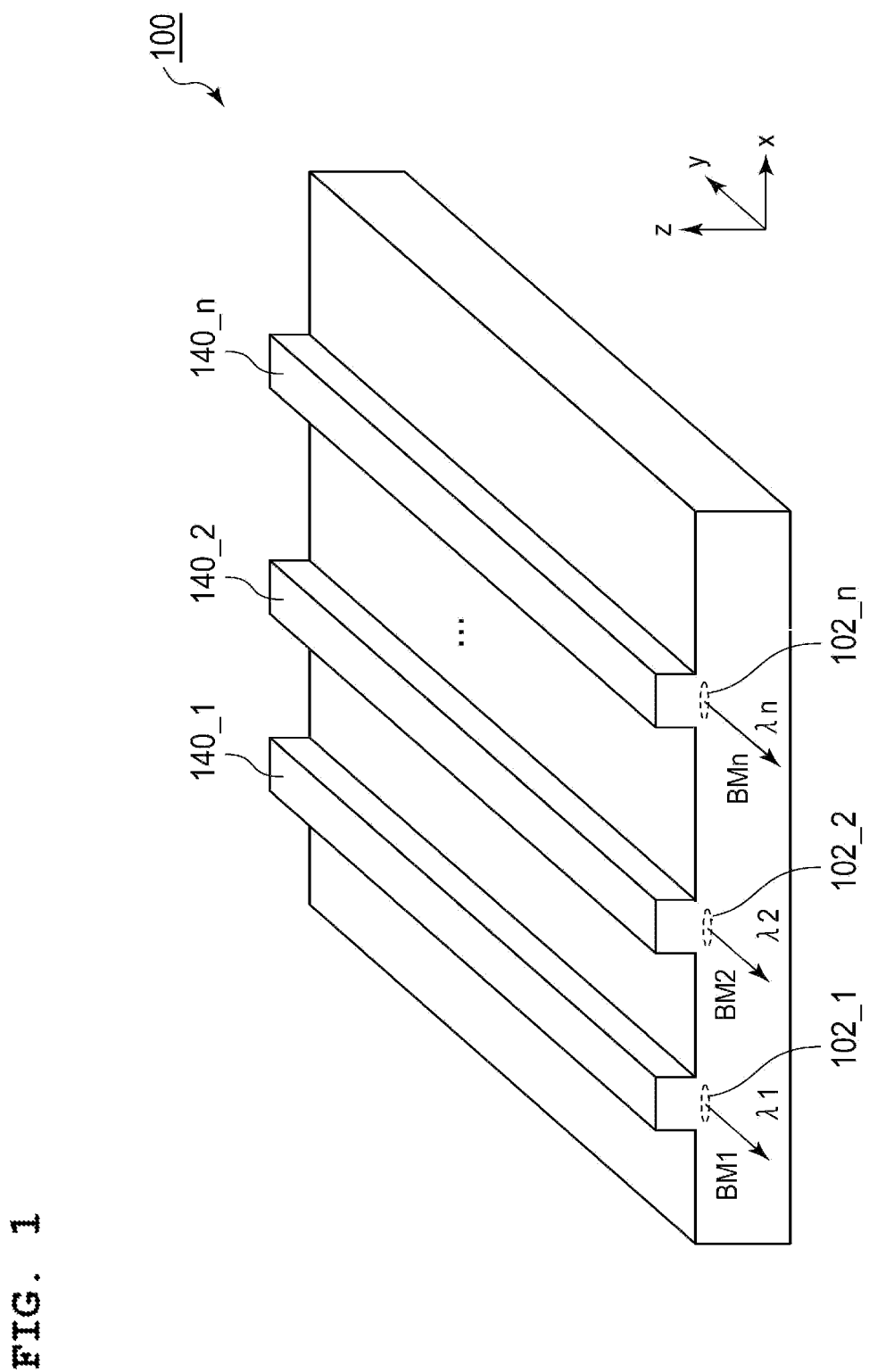
FIG. 1 is a schematic view of a multi-beam semiconductor laser device.

Hereinafter, an overview of some exemplary embodiments of the present disclosure will be described. This overview is intended as a preface to the detailed description that follows, or for a basic understanding of the embodiments. The overview describes some concepts of one or more embodiments in a simplified manner and is not intended to limit the scope of the invention or disclosure. In addition, the overview is not a comprehensive overview of all conceivable embodiments, nor does it limit the indispensable components of embodiments. For convenience, "one embodiment" may be used to refer to one embodiment (Example or Variation Example) or a plurality of embodiments (Examples or Variation Examples) disclosed in the present specification.

An edge-emitting multi-beam semiconductor laser device according to one embodiment includes a layered structure including a substrate, a first conductive cladding layer, a light-emitting layer, and a second conductive cladding layer. The layered structure has m regions (m≥2) that are adjacent in a first direction, and a sum of a height of the substrate and a height of the first conductive cladding layer is different in each of the m regions, n laser resonators (2≤n≤m) each having a ridge stripe structure extending in a second direction orthogonal to the first direction are formed in the n regions among the m regions, and at least two of the n laser resonators have different oscillation wavelengths among the n laser resonators.

The present inventors independently recognized that when a light-emitting layer is deposited on a base having a structure of different height (hereinafter referred to as "base structure"), conditions of its crystal growth, specifically such as the gas flow rate, also the deposition rate and composition, are determined by the unevenness of the base structure. This recognition led to the present disclosure. In other words, making the thickness of the substrate and the n-type cladding layer non-uniform in each region allows the conditions of the growth of the light-emitting layer to be different in each region, leading to readily forming a plurality of laser resonators having different oscillation wavelengths.

In one embodiment, the substrate may have a different thickness in each of the m regions. In other words, the front surface of the substrate may be non-flat and may include unevenness in the first direction. In the present specification, note that the front surface of the substrate is defined as a surface on which the laser resonator is formed, and the back surface of the substrate is defined as the opposite of the front surface.

This configuration is made by performing the crystal growth of the first conductive cladding layer, the light-emitting layer, and the second conductive cladding layer after forming the unevenness on the substrate, thus eliminating the need for multiple separate crystal growth processes, and enabling a decrease in the production cost.

In one embodiment, the m regions may include a first region, a second region, and a third region that are adjacent in this order. The thickness of the substrate in the second region may be greater than the thickness of the substrate in the first region and the thickness of the substrate in the third region, and the laser resonator may be formed in each of the first region and the third region.

The second region corresponds to a convex portion of the base structure, and the first region and the third region correspond to concave portions of the base structure. This configuration allows the substrate in the second region, which has a convex portion, to thermally and/or optically isolate (separate) the two laser resonators formed in the first region and the third region.

In one embodiment, the light-emitting layer in the first region and the light-emitting layer in the third region may be located at a lower height than a front surface of the substrate in the second region.

This configuration enables the heat generated in the light-emitting layer in the first region and the heat generated in the light-emitting layer in the third region to be conducted to the substrate in the second region, suppressing the rise in temperature of the light-emitting layer.

In one embodiment, the substrate may be made of a material that absorbs light having the oscillation wavelength of the laser resonator.

This can suppress an optical coupling of the laser resonators adjacent to each other in the substrate.

In one embodiment, the substrate may include GaAs when the oscillation wavelength of the laser resonator is in the range of 580 to 900 nm, and may include GaN when the oscillation wavelength is 360 nm or lower. The term "include material A" is not limited to the case in which material A itself is included, but may include the case in which a compound of material A is included, or the case in which material A is doped with impurities or other materials.

In one embodiment, the thickness of the substrate in the first region may be different from the thickness of the substrate in the third region.

This makes the deposition rate of the light-emitting layer in the first region different from that in the third region, thus capable of shifting the oscillation wavelength.

In one embodiment, the m regions may further include a fourth region that is disposed opposite to the second region with respect to the first region and adjacent to the first region, and a fifth region that is disposed opposite to the second region with respect to the third region and adjacent to the third region. The width of the first region may be different from the width of the third region.

Controlling the widths of the first region and the third region controls the conditions (gas flow rate) for the crystal growth of the light-emitting layer in the first region and the third region, thereby capable of controlling the oscillation wavelength of the laser resonator.

In one embodiment, a laser resonator having the ridge stripe structure may be further formed in the second region.

In the crystal growth of the light-emitting layer, the second region that corresponds to the convex portion has a condition for the crystal growth different from those of the first region and the third region that correspond to the concave portions. This can readily achieve three different wavelengths.

In one embodiment, the oscillation wavelength of the laser resonator in the second region may be longer than the oscillation wavelengths of the laser resonators in the first region and the third region.

The difference in deposition rates between the convex portion and the concave portion makes a longer wavelength laser resonator to be automatically formed in the second region, which corresponds to the convex portion, compared with the first region and the third region, which correspond to the concave portions. Although the second region, which corresponds to the convex portion, is unfavorable in the viewpoint of heat dissipation compared with the first region and the third region, which correspond to the concave portions, a longer wavelength laser is less affected by temperatures than a shorter wavelength laser. Hence, even if the temperature of a plurality of laser resonators becomes non-uniform, this configuration eliminates the non-uniformity in output caused by the difference in temperature.

In one embodiment, the first conductive cladding layer may have a different thickness in each of the m regions.

Although this configuration needs the process of controlling the thickness of the first conductive cladding layer compared to the case in which the thickness of the substrate is made to be different in each region, this process is much easier than the process in which the light-emitting layer is made to undergo the selective growth.

In one embodiment, the second region is formed with a separation groove extending in the second direction. Forming the separation groove in the second region electrically separates a plurality of laser resonators without preventing heat conduction from proceeding in the lateral direction from the laser resonators in the first region and the third region toward the substrate.

In one embodiment, a semiconductor or a piece of metal that absorbs light having the oscillation wavelength of the laser resonator may be disposed between the laser resonators adjacent to each other.

A method of manufacturing an edge-emitting multi-beam semiconductor laser device according to one embodiment includes:
  forming a base structure including a substrate and a first conductive cladding layer, the base structure having a different thickness in each of m regions (m≥2) adjacent in a first direction;
  forming a light-emitting layer and a second conductive cladding layer on the base structure; and
  forming n laser resonators each having a ridge stripe structure extending in a second direction orthogonal to the first direction in n regions (2≤n≤m) of the m regions.

This method allows the light-emitting layer to undergo crystal growth on a base layer having unevenness (hereinafter referred to as "base structure"), and the conditions for crystal growth in each region (such as gas flow rate) are determined according to the unevenness of the base structure. Hence, this is capable of readily making the oscillation wavelengths of the n laser resonators different.

In one embodiment, forming the base structure may include forming a groove extending in the second direction on the substrate and forming the first conductive cladding layer on the substrate on which the groove has been formed. This method involves in performing the crystal growth of the first conductive cladding layer, the light-emitting layer, and the second conductive cladding layer after forming the unevenness on the substrate, thus eliminating the need for multiple separate crystal growth processes, and enabling a decrease in the production cost.

In one embodiment, forming the groove may include forming the plurality of grooves having different widths. Controlling the width of the grooves controls the conditions for crystal growth of the light-emitting layer in each groove (flow rate, velocity, concentration, etc. of the gas), thereby controlling the oscillation wavelength of the laser resonator formed in each groove.

EMBODIMENT

Hereinafter, the present disclosure will be described with reference to the drawings based on suitable embodiments. Identical or equivalent components, members, and processes shown in the respective drawings are marked with the same symbols, and duplicated explanations are omitted as appropriate. The embodiments are intended to be exemplary rather than to limit the disclosure, and all features and combinations thereof described in the embodiments are not necessarily essential to the disclosure.

The dimensions (thickness, length, width, etc.) of each member described in the drawings may be scaled as appropriate for ease of understanding. Furthermore, the dimensions of a plurality of members do not necessarily represent their relationship in size; although one member A is drawn thicker than another member B on the drawing, the member A may be thinner than the member B, for example.

FIG. 1 is a schematic view of a multi-beam semiconductor laser device 100. The multi-beam semiconductor laser device 100 is of an edge-emitting type and includes a plurality of n (n≥2) emitters 102_1 to 102_n that are adjacent in the first direction (x direction in FIG. 1), from which a plurality of beams BM1 to BMn can be emitted, respectively. The configuration and function corresponding to a single beam can also be referred to as a channel.

The multi-beam semiconductor laser device 100 includes n laser resonators 140_1 to 140_n corresponding to n beams and is formed monolithically on a single chip (die). The n laser resonators 140_1 to 140_n each have a ridge stripe structure extending in the second direction (y direction in FIG. 1). The ridge stripe structure is formed by partially removing the p-type cladding layer from the crystal layer (epi layer), which includes the n-type (first conductive) cladding layer, the light-emitting layer, and the p-type (second conductive cladding layer), as will be described below. The ridge stripe structure may also be simply referred to as a ridge or a ridge structure. A bank (not shown in FIG. 1) may be formed between two adjacent laser resonators 140.

The above is the basic structure of the multi-beam semiconductor laser device 100. In the present embodiment, n laser resonators 140_1 to 140_n have their respective different oscillation wavelengths $\lambda_1$ to $\lambda_n$, respectively. The oscillation wavelengths $\lambda_1$ to $\lambda_n$ are preferably all different from each other, but some of them may have the same wavelength. Hereinafter, the specific configuration of the multi-beam semiconductor laser device 100 according to the embodiment will be described with reference to some examples.

Example 1

Figure 2:
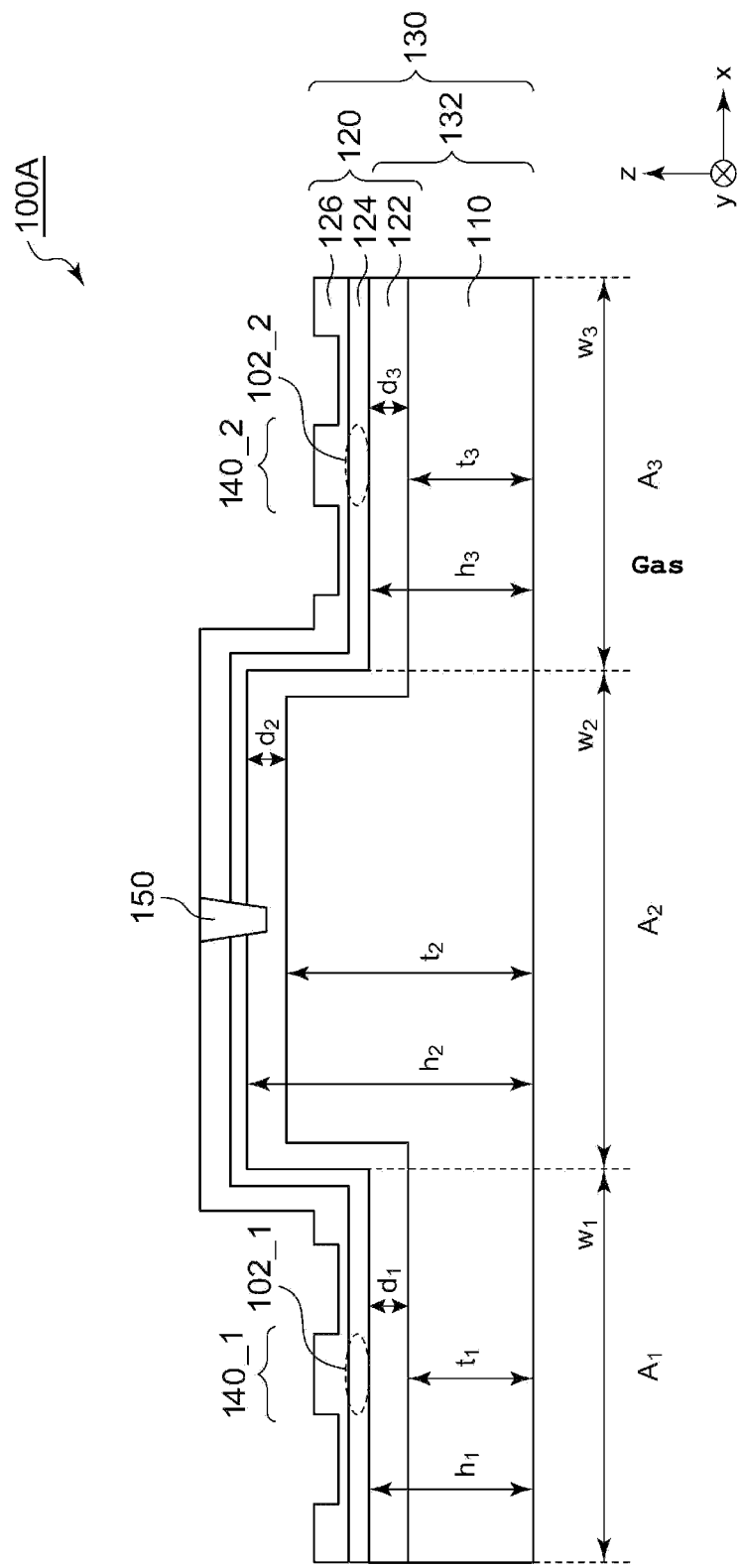
FIG. 2 is a cross-sectional view of a multi-beam semiconductor laser device according to Example 1.

FIG. 2 is a cross-sectional view of a multi-beam semiconductor laser device 100A according to Example 1. The multi-beam semiconductor laser device 100A includes a layered structure 130. The layered structure 130 includes a substrate 110, an n-type cladding layer 122, a light-emitting layer (also called an active layer) 124, and a p-type cladding layer 126. As described below, the n-type cladding layer 122, the light-emitting layer 124, and the p-type cladding layer 126 are formed by epitaxial growth, and these layers are referred to as a laser multi-layer structure 120. Note that the multi-beam semiconductor laser device 100A may also include an electrode formed on the back surface of the substrate 110 and an electrode or a contact layer formed on the upper side of the p-type cladding layer 126, but these are omitted in FIG. 2.

In the layered structure 130, a height h that is a sum of the substrate 110 and the n-type cladding layer 122 (a stack of these two layers is referred to as a base structure 132) is different in each of m regions (m≥2) $A_1$ to $A_m$ that are adjacent in the first direction (x-direction). In FIG. 2, for the simplification of explanation and ease of understanding, the case of m=3 is described. In practice, another region may exist on the left side of the first region $A_1$, and another region may exist on the right side of the third region $A_3$.

The thickness of the substrate 110 in the i-th region $A_i$ is denoted as $t_i$, and the thickness of the n-type cladding layer 122 is denoted as $d_i$. The sum of the thickness $t_i$ of the substrate 110 and the thickness $d_i$ of the n-type cladding layer 122 is referred to as a height of $h_i$ and is expressed as the following equation.

$$h_i = t_i + d_i$$

In the present example, the thicknesses $d_1$ to $d_3$ of the n-type cladding layer 122 are substantially uniform, and the thicknesses $t_1$ to $t_3$ of the substrate 10 are non-uniform in the three regions $A_1$ to $A_3$. Specifically, the thickness $t_2$ of the substrate 110 in the central second region $A_2$ is thicker than the thicknesses $t_1$ and $t_3$ of the substrate 110 in the first region $A_1$ and the third region $A_3$, which are located on both sides of region $A_2$, thus the height $h_2$ is larger than $h_1$ and $h_3$.

In the present example, n laser resonators 140_1 to 140_n are formed in n regions of the m regions (2≤n≤m), each laser resonator having the ridge stripe structure extending in the second direction (y-axis direction in this example) orthogonal to the first direction (x-axis direction in this example). The present example represents the case of n=2, thus the laser resonators 140_1 and 140_2 are formed in the first region $A_1$ and the third region $A_3$.

When the plurality of laser resonators 140 is desired to be driven independently, the laser resonators 140_1 to 140_n need to be electrically isolated. The multi-beam semiconductor laser device 100A is provided with a separation groove 150 to electrically isolate the adjacent laser resonators 140_1 and 140_2. This separation groove 150 is formed in the second region $A_2$ along the second direction (y direction, direction toward paper depth). The separation groove 150 may be hollow, be filled with an insulator, or have an insulating layer formed on the front surface of the separation groove 150.

The configuration of the multi-beam semiconductor laser device 100A has been described above. Hereinafter, the first advantage of the multi-beam semiconductor laser device 100A will now be described. The first advantage of the multi-beam semiconductor laser device 100A involves the ease of manufacturing the multi-beam semiconductor laser device 100A.

The present inventors independently have recognized that when a light-emitting layer is deposited on a base structure having various heights, the unevenness of the base structure determines the conditions for crystal growth, such as gas flow rates, even deposition rates, and composition.

In Example 1, the light-emitting layer 124 is deposited on the base structure 132 that is constituted by the substrate 110 in which each of the regions $A_1$ to $A_3$ has a different thickness $t_1$ to $t_3$ respectively, and the n-type cladding layer 122. This configuration allows the conditions for crystal growth of the light-emitting layer 124 to be different for each of the regions $A_1$ to $A_3$, resulting in forming the light-emitting layer 124 having different thicknesses and compositions in each of the plurality of regions $A_1$ to $A_3$. The thickness of the light-emitting layer 124 may not refer to only the thickness of the entire light-emitting layer 124, but refer to the thickness of the guide layer and quantum well layer, which are sublayers included in the light-emitting layer 124. Hence, forming the plurality of laser resonators 140_1 and 140_2 in a manner that the light-emitting layers 124 having different thicknesses and compositions are included therein enables the oscillation wavelengths $\lambda_1$ and $\lambda_2$ of the plurality of laser resonators 140_1 and 140_2 to be readily made different.

The deposition rate in the i-th (i=1, 2, ..., n) region $A_i$, is affected by the height $h_i$, of the region $A_i$.

The deposition rate in the i-th (i=1, 2, ..., n) region $A_i$, is affected by the width $w_i$ of the region $A_i$.

The deposition rate in the i-th (i=1, 2, ..., n) region $A_i$ is also affected by the adjacent regions $A_{i-1}$ and $A_{i+1}$. Specifically, the deposition rate in the region $A_i$ is affected by the widths $w_{i-1}$ and $w_{i+1}$ of the adjacent regions $A_{i-1}$ and $A_{i+1}$, respectively. The deposition rate in the region $A_i$ is also affected by the difference in height $\Delta h_{i+}$ from the region $A_{i+1}$ adjacent to the right thereof, the difference in height being expressed as $\Delta h_{i+} = h_i - h_{i+1}$. Similarly, the deposition rate in region $A_i$ is also affected by the difference in height $\Delta h_{i-}$ from the region $A_{i-1}$ adjacent to the left thereof, the difference in height being expressed as $\Delta h_{i-}=h_i-h_{i-1}$.

In summary, the oscillation wavelength of the laser resonator 140 formed in the region $A_i$ is determined by the combination of the following:

(i) Height $h_i$ of region $A_i$
(ii) Width $w_i$ of region $A_i$
(iii) Height $h_{i+1}$ and $h_{i-1}$ of adjacent regions $A_{i+1}$ and $A_{i-1}$, respectively
(iv) Width $w_{i+1}$ and $w_{i-1}$ of adjacent regions $A_{i+1}$ and $A_{i-1}$, respectively Hence, designing the height and width of the plurality of regions of the base structure 132 as design parameters is capable of forming the plurality of laser resonators 140 having different oscillation wavelengths.

Hereinafter, the second advantage of the multi-beam semiconductor laser device 100A will be described. The second advantage involves the heat dissipation (cooling) of the multi-beam semiconductor laser device 100A.

Figure 3:
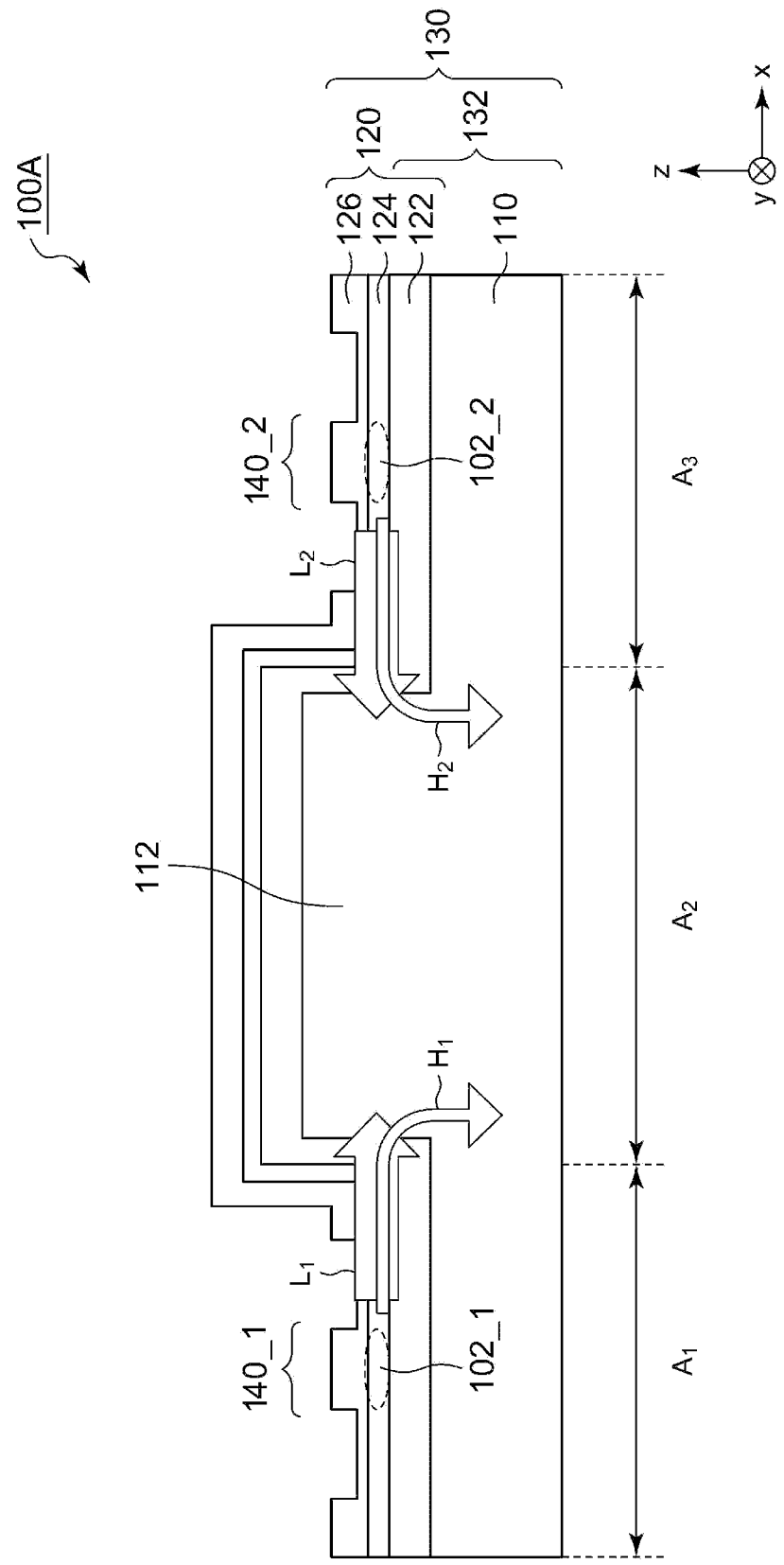
FIG. 3 is a view illustrating the heat dissipation of the multi-beam semiconductor laser device in FIG. 2.

FIG. 3 is a view illustrating the heat dissipation of the multi-beam semiconductor laser device 100A in FIG. 2. When the laser resonators 140_1 and 140_2 perform a laser oscillation, the light-emitting layers 124 and the p-type cladding layer 126 generate heat as the main heat sources. The heat generated at the light-emitting layer 124 in the first region $A_1$ and the heat generated at the light-emitting layer 124 in the third region $A_3$ diffuse into the surroundings. In the multi-beam semiconductor laser device 100A shown in FIG. 2, the convex portion 112 of the substrate 110 exists beside the light-emitting layers 124 in the first region $A_1$ and the third region $A_3$. Since the thermal conductivity of the substrate 110 is greater than that of the separation groove 150, heat $H_1$ and $H_2$ from the light-emitting layers 124 are dissipated through the convex portion 112 of the substrate 110 in the second region $A_2$ without being shielded by the separation groove 150. This is the second advantage.

To gain more of the second advantage, the light-emitting layer 124 in the first region $A_1$ and the light-emitting layer 124 in the third region $A_3$ are preferably located at a lower height than the height of the front surface of the substrate 110 in the second region $A_2$ (i.e., $t_2$).

The advantage of the multi-beam semiconductor laser device 100A with respect to heat dissipation properties becomes clear in comparison with a comparative technology.

FIG. 4 is a view illustrating the improvement in heat dissipation properties in the multi-beam semiconductor laser device 100A of the embodiment. The upper part of FIG. 4 shows a model in which the convex portion 112 of the substrate 110 exists beside the light-emitting layer 124 of the laser resonator 140, which is a heat source. The lower part of FIG. 4 shows a model of a multi-beam semiconductor laser device according to the comparative technology. In the comparative technology, the substrate 110 is flat and adjacent channels are electrically (and optically) isolated (separated) by a separation groove 151 made of SiO2 instead of the convex portion 112. The middle part of FIG. 4 shows a graph of the simulation results in which the horizontal axis denotes the distance from the heat source and the vertical axis denotes the internal temperature. Note that x=0 refers to the location of the heat source. Also note that $x_1$ refers to the location of the side wall of the convex portion 112 of the substrate 110 in the embodiment, and the position of the separation groove 151 in the comparative technology.

In the comparative technology in which the separation groove 151 is formed, the separation groove 151 serves as a thermal resistance, making the internal temperature of a region close to the heat source relatively high. In contrast, in the embodiment, heat is efficiently dissipated through the convex portion 112 of the substrate 110, thereby capable of lowering the internal temperature in an area close to the heat source compared with the comparative technology.

Hereinafter, the third advantage of the multi-beam semiconductor laser device 100A will now be described. The third advantage involves the suppression of optical crosstalk between channels.

Referring back to FIG. 3, the suppression of optical crosstalk will be described. In each of the laser resonators 140_1 and 140_2, laser light is guided in the depth direction (y direction) and emitted from emitters 102_1 and 102_2 as a beam BM, respectively. Leaked light L1 and L2 including spontaneous emission light or part of the laser light also emits in the transverse direction (x direction). When the substrate 110 is made of a semiconductor material having a band gap that serves to absorb the oscillation wavelength of the laser, the leaked light $L_1$ and $L_2$ comes to be absorbed by the convex portion 112 of the substrate 110. Hence, the multi-beam semiconductor laser device 100A can suppress optical crosstalk between the adjacent laser resonators 140_1 and 140_2.

The substrate 110 is suitably made of GaAs when the oscillation wavelengths $\lambda_1$ to $\lambda_n$ are in the range of 580 to 900 nm. The substrate 110 is suitably made of GaN when the oscillation wavelengths $\lambda_1$ to $\lambda_n$ are 360 nm or less.

The configurations and advantages of the multi-beam semiconductor laser device 100A have been described above. Hereinafter, its manufacturing method will be described.

FIGS. 5A to 5F are views illustrating a method of manufacturing the multi-beam semiconductor laser device 100A of FIG. 2.

Figure 5A:
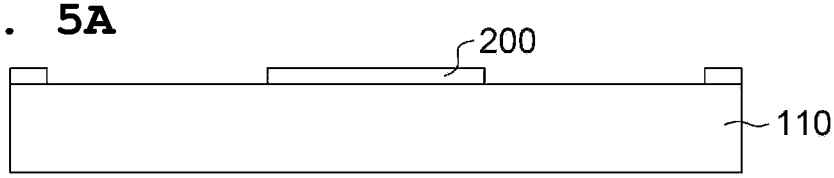
FIG. 5A is a view illustrating a method of manufacturing the multi-beam semiconductor laser device in FIG. 2.
Figure 5B:
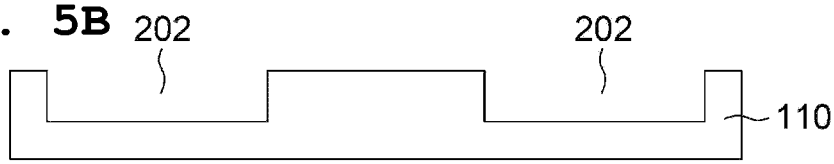
FIG. 5B is a view illustrating a method of manufacturing the multi-beam semiconductor laser device in FIG. 2.

FIGS. 5A and 5B illustrate the process of forming unevenness on the substrate 110 made of GaAs (hereinafter referred to as GaAs substrate). First, a layer 200 that serves as a mask when the GaAs substrate 110 is etched, is deposited on the GaAs substrate 110. The layer 200 is patterned in a stripe shape in accordance with the pitch of the multi-beam. The layer 200 can be made of $SiO_2$, for example. FIG. 5A shows the layer 200 that has been patterned. In the case of a 50 μm pitch, for example, the layer 200 is formed with a line and space pattern of a 25 μm width (50 μm pitch). With the layer 200 being used as a mask, grooves 202 having a depth of 2 μm, for example, are formed in the substrate 110. After the grooves 202 have been formed, the layer 200, which is made of $SiO_2$, is removed with a hydrofluoric acid solution to clean the front surface.

Figure 5C:
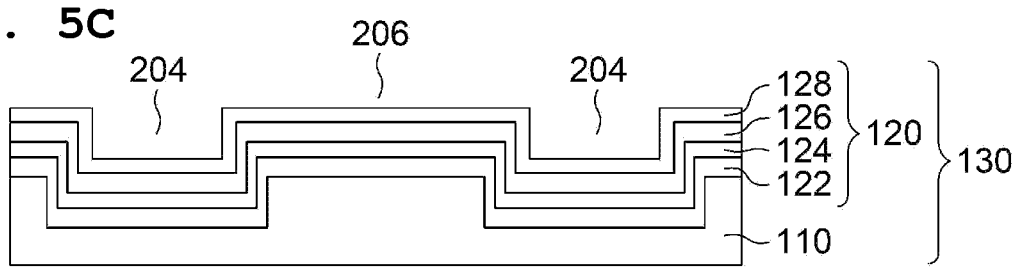
FIG. 5C is a view illustrating a method of manufacturing the multi-beam semiconductor laser device in FIG. 2.

With reference to FIG. 5C, a laser multi-layer structure 120 is epitaxially grown by MOCVD (Metal Organic Chemical Vapor Deposition) method on the GaAs substrate in which the grooves have been formed. A typical multi-layer structure includes the n-type cladding layer 122, the light-emitting layer 124 (also called an optical waveguide core layer) including a guide layer and a quantum well layer, the p-type cladding layer 126, and a p-type contact layer 128. Each layer can be subdivided according to its composition and doping concentration. As an example, the composition of the n-type cladding layer 122 is $(Al_xGa_{1-x})_{1-y}In_yP$ where x=1 and y=0.5. In order to achieve lattice match with the GaAs substrate 110, the In composition y is set to 0.5 in the present embodiment. In the Al to Ga composition ratio x:1−x, x is larger than 1−x; thus x:1−x=1:0 can be available. After the n-type cladding layer 122 is formed, a lower guide layer, the quantum well layer, a barrier layer, and an upper guide layer are deposited in sequence to form the light-emitting layer 124. The guide layer is often called an SCH layer or a confinement layer. The guide layer has a higher refractive index than those of the cladding layers 122 and 126, and has a lower refractive index than that of the quantum well layer. Hence, the supply of raw material is adjusted in a manner that the Al composition ratio x is highest in the cladding layers 122 and 126, and becomes lower in the order of the guide layer or the barrier layer, and the quantum well layer. In particular, the Al composition ratio x is low in the quantum well layer, and in the present example, the composition of the guide layer and the barrier layer is set to x=0.7, y=0.5. The quantum well layer is described as GaInP (x=0). The guide layer, the barrier layer, and the quantum well layer function as the core layer in the optical waveguide through which the laser light propagates. The thickness of the core layer depends on the wavelength and the refractive index of each layer; however, it is approximately 50 nm to 500 nm for a red laser. In the present example, the thickness is about 100 nm in total. Subsequently, the p-type cladding layer 126 is deposited, followed by a p-type GaAs being deposited as the p-type contact layer 128 (also called a cap layer). As an example, the thickness of the p-type cladding layer 126 can be 1700 nm, and the thickness of the p-type contact layer 128 can be 300 nm.

As shown in FIG. 5C, the layered structure 130 includes a concave portion 204 and a convex portion 206 in accordance with the unevenness of the GaAs substrate 110.

Figure 5D:
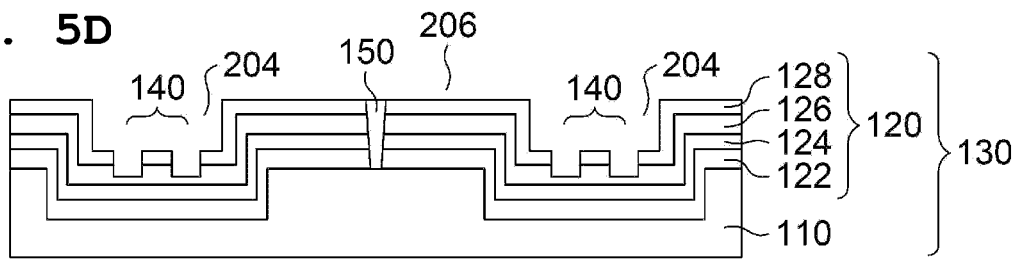
FIG. 5D is a view illustrating a method of manufacturing the multi-beam semiconductor laser device in FIG. 2.

Subsequently, as shown in FIG. 5D, the laser resonators (laser structure) 140 each having a ridge stripe structure are formed in the concave portions 204 of the layered structure 130.

Specifically, by using photolithography technique and etching technique, the p-type contact layer 128 and the p-type cladding layer 126 are partially removed to form the ridge structure. Moreover, a bank structure may be formed in each p-type cladding layer 126 when the ridge structure is formed in each p-type cladding layer 126. Each bank can be provided on both sides of each ridge structure.

When the plurality of laser resonators 140 is desired to be controlled independently, the separation groove 150 is formed. In the present example, forming the groove on the convex portion 206 in which no emitter (laser resonator 140) is formed ensures electrical isolation. Forming the separation groove 150 in the convex portion 206 allows the separation groove 150 not to interfere with the heat from the laser resonator 140 for dissipating through the substrate 110 of the convex portion 206, thereby maintaining heat dissipation properties.

Figure 5E:
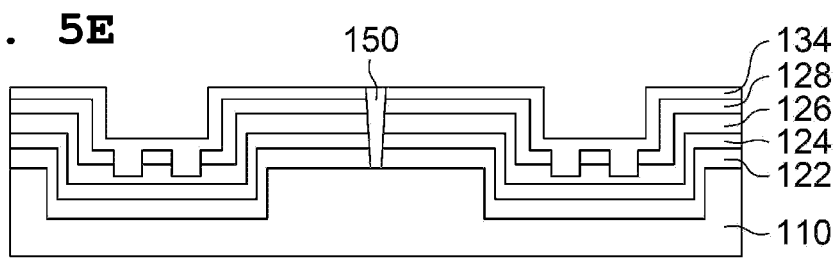
FIG. 5E is a view illustrating a method of manufacturing the multi-beam semiconductor laser device in FIG. 2.

Next, as shown in FIG. 5E, an insulating layer 134 including a SiO$_2$ layer is formed on the front surface of the ridge structure and the bank structure using a method such as plasma CVD.

Figure 5F:
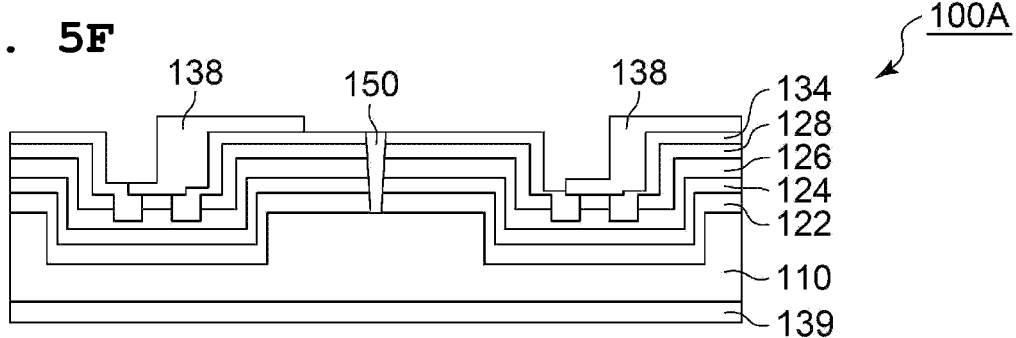
FIG. 5F is a view illustrating a method of manufacturing the multi-beam semiconductor laser device in FIG. 2.

Next, as shown in FIG. 5F, the insulating layer 134 is patterned using photolithography technique and dry etching technique to form openings that make the upper surface of each ridge structure exposed in the insulating layer 134. Next, an electrode material made of a metal such as Au is formed over the openings and the insulating layer 134 using a method such as sputtering or vapor deposition. Furthermore, the electrode material on the insulating layer 134 is patterned to form electrodes 138 connected to each ridge structure via each opening on the insulating layer 134. An electrode 139 is also formed on the back surface of substrate 110. In addition, the semiconductor substrate on which the electrodes 138 have been formed is cleaved into a bar shape. Then, an edge protective layer is deposited on the cleaved surface, which is the end face of the bar, using sputtering or other methods. The bar having the cleaved surface coated with the edge protective layer is then broken into pieces to complete the multi-beam semiconductor laser device 100A.

The method of manufacturing the multi-beam semiconductor laser device 100A has been described above. As shown in FIG. 5C, when the laser multi-layer structure 120 is deposited on the GaAs substrate 110 with grooves, in other words, having unevenness, the variance in the height and width of the grooves (regions A1-A3 in FIG. 2) can make the deposition rate vary because the variance in the height and width of the grooves makes gas flow rate in MOCVD locally vary. Utilizing this effect actively makes it possible to introduce intentional deviations in the thickness and composition of the light-emitting layers 124 in each region, thereby achieving a multi-beam semiconductor laser with different wavelengths among the beams.

The local variance in the deposition rate is more significant when the width of the unevenness portion is narrower, hence for the deposition rate to be desired to be more uniform, the width of the unevenness portion is widened.

This manufacturing method eliminates the need for performing epitaxial growth a plurality of times in order to enable multi-beams with multiple wavelengths; instead, it only needs to perform epitaxial growth once. This can manufacture a multi-beam semiconductor laser with different wavelengths among beams at a low cost.

Example 2

Figure 6:
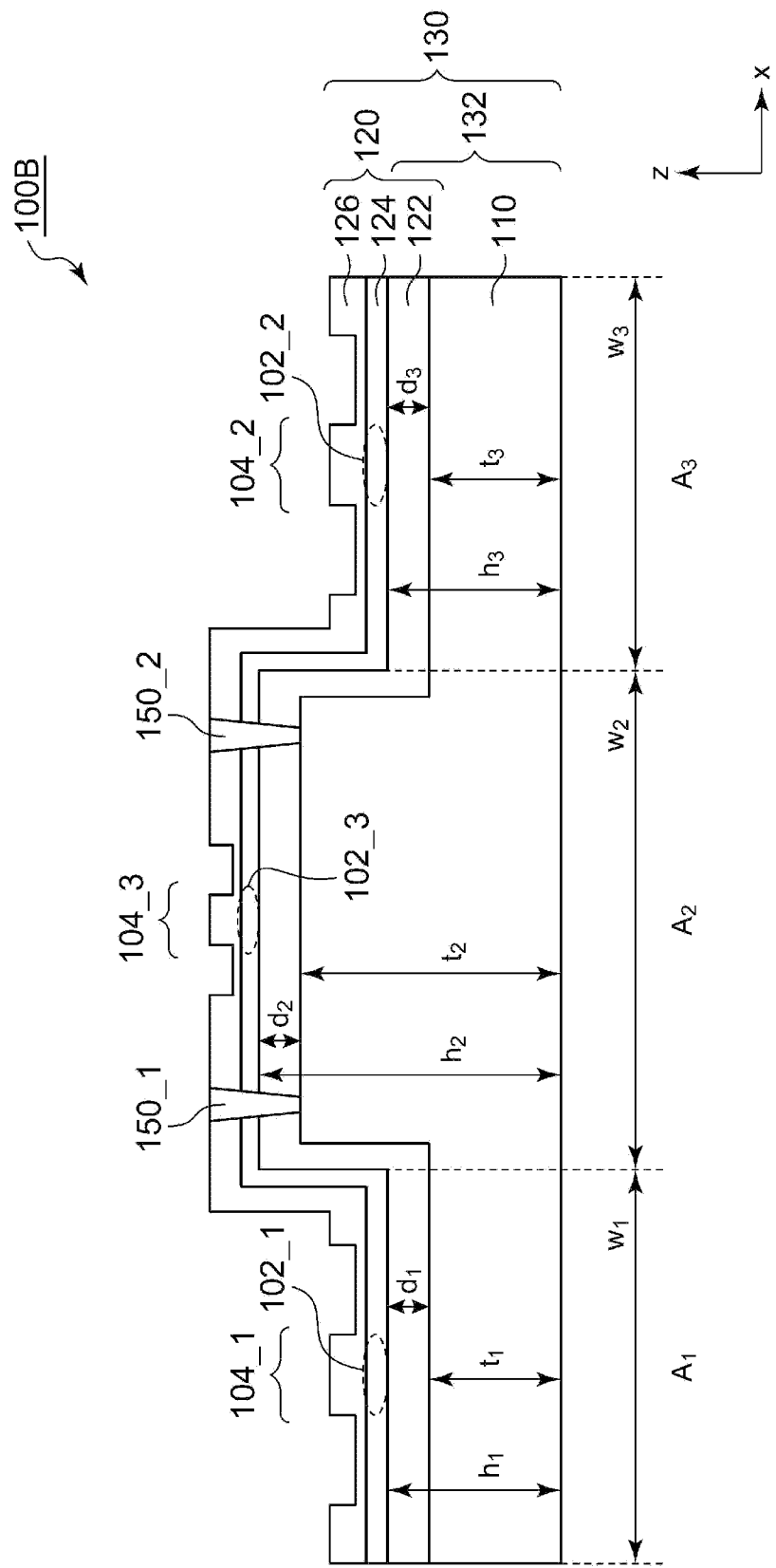
FIG. 6 is a cross-sectional view of a multi-beam semiconductor laser device according to Example 2.

FIG. 6 is a cross-sectional view of a multi-beam semiconductor laser device 100B according to Example 2. The structure of the multi-beam semiconductor laser device 100B will be described with focusing attention on the differences from the multi-beam semiconductor laser device 100A of Example 1 (FIG. 2).

As is similar to the multi-beam semiconductor laser device 100A, the multi-beam semiconductor laser device 100B includes a layered structure 130 having unevenness. In the layered structure 130, the height of the base structure 132 is different in each of the regions $A_1$ to $A_3$.

Example 2 represents the case of n=3, thus the laser resonator 140_3 is formed in the second region $A_2$ in addition to the first region $A_1$ and the third region $A_3$.

In order to make the laser resonators 140_1 to 140_3 independently controllable, it is necessary to electrically isolate between the adjacent laser resonators 140. For this purpose, the separation grooves 150_1 and 150_2 are formed between the laser resonators 140_1 and 140_3, and between the laser resonators 140_2 and 140_3, respectively. The separation grooves 150_1 and 150_2 are preferably formed in the second region A2, which corresponds to a convex portion. Forming the separation grooves 150_1 and 150_2 in the convex portion allows the separation grooves 150_1 and 150_2 not to interfere with the heat from the laser resonators 140_1 and 140_2, thereby enabling the heat dissipation through the substrate 110 of the convex portion 206.

With regard to the laser resonator 140_3 formed in the second region $A_2$, which is a convex portion, the light-emitting layer 124 includes no substrate 110 on its side and is even sandwiched by the separation grooves 150_1 and 150_2, which have low thermal conductivity. Hence, the laser resonator 140_3 has heat dissipation conditions similar to those of the comparative technology described with reference to FIG. 4, which makes the laser resonator 140_3 less favorable than the laser resonators 140_1 and 140_2 formed in the concave portion. However, this seemingly unfavorable point acts on suppressing the variations in output among the plurality of beams, as will be described below.

As described above, since the variance of the height and width of the regions $A_1$ to $A_3$ causes the gas flow velocity in MOCVD to vary locally, the variance of the height and width of the grooves can make the deposition rate different. As a result, the oscillation wavelength $\lambda_3$ of the laser resonator 140_3 formed in the second region $A_2$ is longer than the oscillation wavelength $\lambda_1$ and $\lambda_2$ of the laser resonators 140_1 and 140_2 formed in the first region $A_1$ and the third region $A_3$, respectively. When $\lambda_1$ and $\lambda_2$ are approximately 640 nm, for example, $\lambda_3$ can be made to 645 nm.

Here, the extent to which the beam output decreases with rising temperature is more pronounced at shorter oscillation wavelengths. If the rise in temperature of the plurality of laser resonators 140_1 to 140_3 is uniform, then the output of the long wavelength laser resonator 140_3 is larger than the output of the shorter wavelength laser resonators 140_1 and 140_2, resulting in variations in output among the beams. In contrast, in the multi-beam semiconductor laser device 100B according to Example 2, the rise in temperature of the long wavelength laser resonator 140_3 is larger than the rise in temperature of the short wavelength laser resonator 140_1 and 140_2, which makes the output of the three beams become uniform.

Hereinafter, the method of manufacturing the multi-beam semiconductor laser device 100B according to Example 2 will now be described.

Figure 7A:
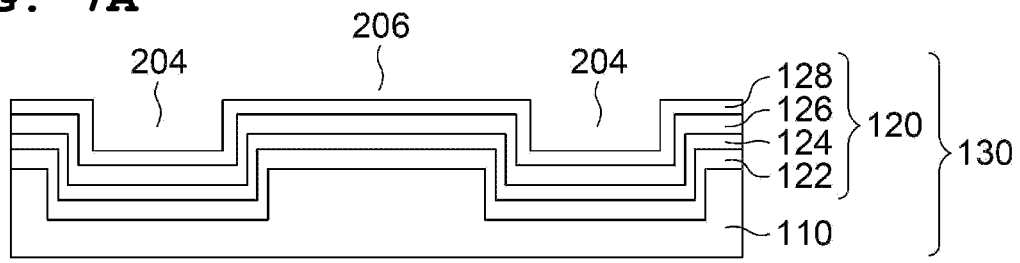
FIG. 7A is a view illustrating a method of manufacturing the multi-beam semiconductor laser device in FIG. 6.

FIGS. 7A to 7D are views illustrating a method of manufacturing the multi-beam semiconductor laser device of FIG. 6. FIG. 7A shows the layered structure 130 including the concave portions 204 and the convex portion 206. The manufacturing process of the layered structure 130 in Example 2 is similar to that in Example 1, which has already been described with reference to FIGS. 5A to 5C.

In Example 2, note that the line and space of the grooves in the GaAs substrate 110 may be different from that in Example 1 because a laser resonator is also formed in the convex portion 206. In the case of a 50 μm pitch, for example, the grooves may be formed with a line and space pattern having a width of 50 μm (100 μm pitch).

Figure 7B:
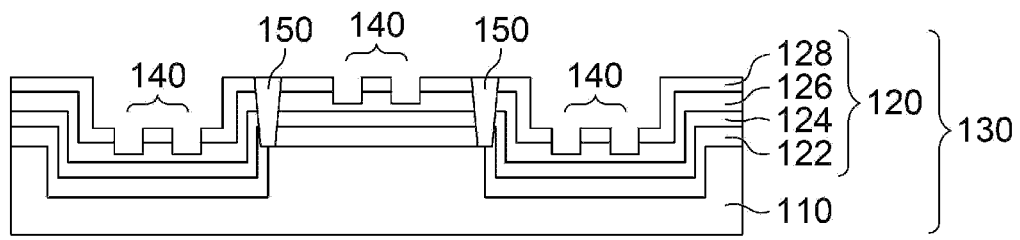
FIG. 7B is a view illustrating a method of manufacturing the multi-beam semiconductor laser device in FIG. 6.
Figure 7C:
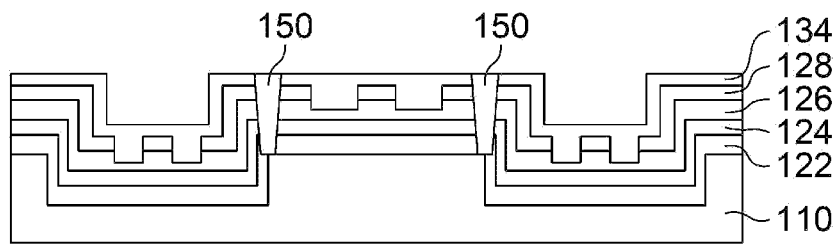
FIG. 7C is a view illustrating a method of manufacturing the multi-beam semiconductor laser device in FIG. 6.
Figure 7D:
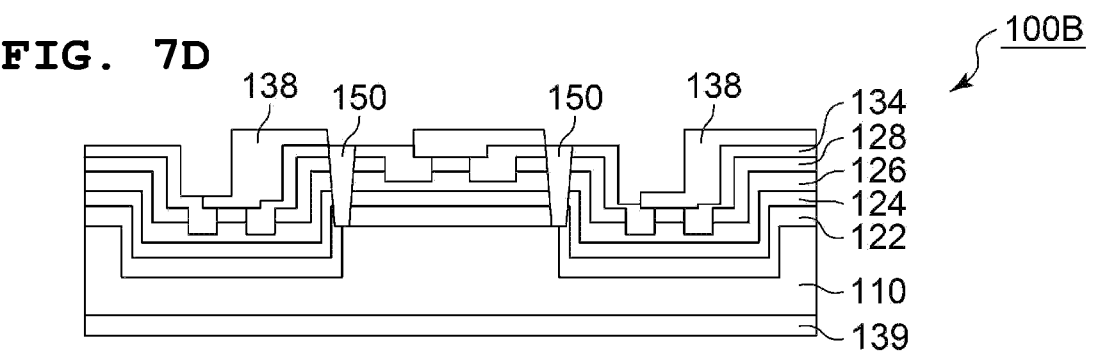
FIG. 7D is a view illustrating a method of manufacturing the multi-beam semiconductor laser device in FIG. 6.

Next, as shown in FIG. 7B, the laser resonator 140 is formed on the concave portions 204 and the convex portion 206, as is similar to the process in Example 1 (FIG. 5D). Then, as shown in FIGS. 7C and 7D, the insulating layer 134, and the electrodes 138 and 139 are formed.

The method of manufacturing the multi-beam semiconductor laser device 100B has been described above. This manufacturing method, which is similar to that in Example 1, allows the light-emitting layers 124 to be grown at different deposition rates in the respective regions, thereby readily making the oscillation wavelengths different.

Example 3

Figure 8:
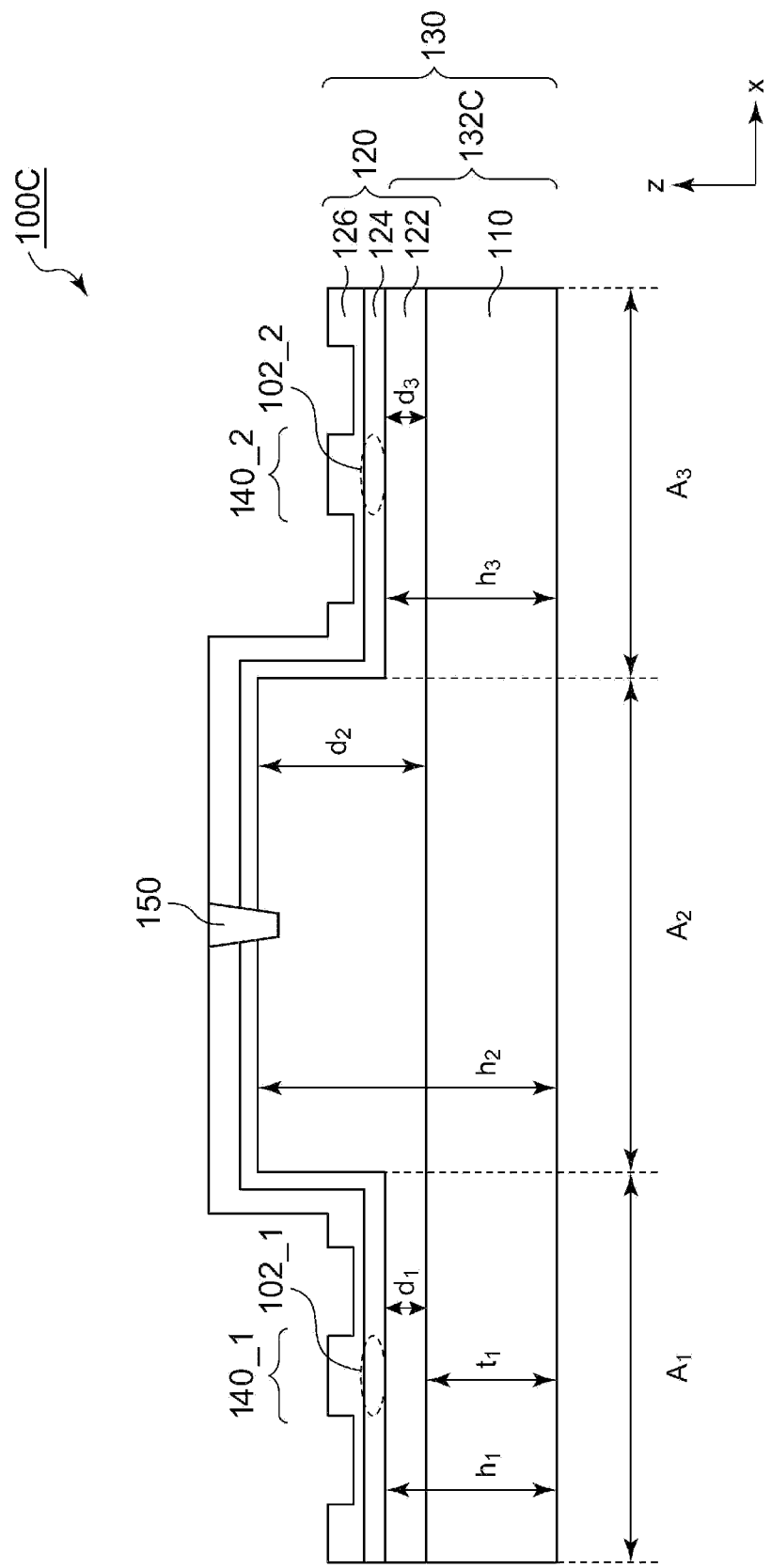
FIG. 8 is a cross-sectional view of a multi-beam semiconductor laser device according to Example 3.

FIG. 8 is a cross-sectional view of a multi-beam semiconductor laser device 100C according to Example 3. In Example 3, a base structure 132C having unevenness is provided as similar to that in Example 1, but the structure of the base structure 132C is different from that of Example 1. Specifically, in Example 3, the base structure 132C includes the n-type cladding layer 122 with different thicknesses $d_1$ to $d_3$ in the regions $A_1$ to $A_3$, respectively, formed on the substantially flat substrate 110. Other details in Example 3 are similar to those in Example 1.

The method of forming the n-type cladding layer 122 with different thicknesses in the respective regions is not particularly limited to the present embodiment. For example, after the n-type cladding layer 122 with the same thickness is formed over all the regions, the n-type cladding layer 122 may be selectively etched to a different depth in each region. Alternatively, the n-type cladding layer 122 in each region may be selectively grown to have a different thickness.

In Example 3, the unevenness of the base structure 132 C, which serves as a base, makes the deposition rate in the respective regions $A_1$ to $A_3$ different during the epitaxial growth of the light-emitting layer 124. This enables the multi-beams with different wavelengths.

In Example 3, since the laser resonator 140 formed in the concave portions has no convex portion of the substrate 110 on its side, this configuration is unfavorable from the viewpoint of heat dissipation compared to Example 1. However, this configuration fails to shield heat due to the separation groove 150, hence it is advantageous in terms of head dissipation, compared with the comparative technology shown in FIG. 4, i.e., the configuration in which the substrate 110 is made flat, and the separation groove 151 made of $SiO_2$ is formed instead of the convex portion 112.

In the multi-beam semiconductor laser device 100C shown in FIG. 8, the laser resonator 140 may be formed in the second region $A_2$, which is a convex portion, as is similar to that in Example 2.

VARIATION EXAMPLES

The embodiments and examples described above are merely examples, and it is understood by those skilled in the art that various Variation Examples are possible in the combination of their respective components and respective processing processes. Hereinafter, Variation Examples will be described below.

Variation Example 1

The cross-sectional shape of the base structure 132 and the arrangement of the laser resonator 140 are not limited to those described in the embodiments. As described above, the oscillation wavelength of the laser resonator 140 formed in any region $A_i$ is determined by a combination of the following design parameters (i) to (iv).

(i) Height $h_i$ of region $A_i$
(ii) Width $w_i$ of region $A_i$
(iii) Height $h_{i+1}$ and $h_{i-1}$ of adjacent regions $A_{i+1}$ and $A_{i-1}$, respectively
(iv) Width $w_{i+1}$ and $w_{i-1}$ of adjacent regions $A_{i+1}$ and $A_{i-1}$, respectively Hence, in order to form the plurality of laser resonators 140 having different oscillation wavelengths, the regions $A_i$ and $A_j$, in which the laser resonators 140 are formed, are selected in a manner that at least one of the parameters (i) to (iv) is different from those among the plurality of regions.

FIGS. 9A to 9G are simplified cross-sectional views of the multi-beam semiconductor laser device 100 according to Variation Example. FIGS. 9A to 9G schematically illustrate the cross-sectional shape of the base structure 132 and the arrangement of the laser resonators 140.

Figure 9A:
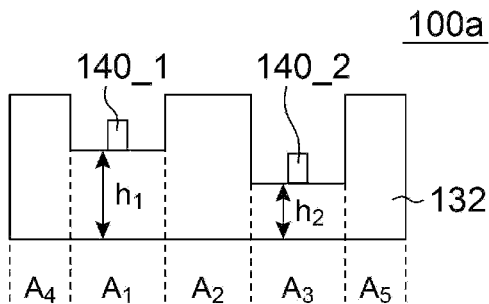
FIG. 9A is a simplified cross-sectional view of a multi-beam semiconductor laser device according to Variation Example.

FIG. 9A is an example in which the parameter (i) is different. The multi-beam semiconductor laser device 100a in FIG. 9A represents the case of m=5 and n=2 and illustrates five regions $A_1$ to $A_5$ and the two laser resonators 140_1 and 140_2. The regions $A_1$ and $A_3$ in which the laser resonators 140_1 and 140_2 are formed have the different heights $h_1$ and $h_3$, respectively.

Figure 9B:
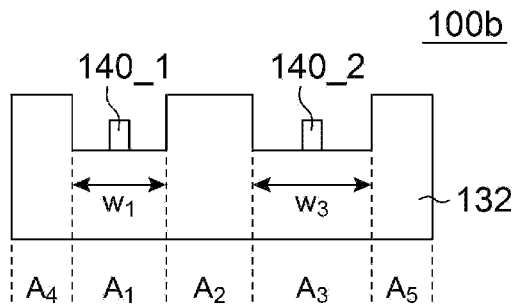
FIG. 9B is a simplified cross-sectional view of the multi-beam semiconductor laser device according to Variation Example.

FIG. 9B is an example in which the parameter (ii) is different. The multi-beam semiconductor laser device 100b in FIG. 9B represents the case of m=5 and n=2 and illustrates the five regions $A_1$ to $A_5$ and the two laser resonators 140_1 and 140_2. The regions $A_1$ and $A_3$ in which the laser resonators 140_1 and 140_2 are formed have the different widths $w_1$ and $w_3$, respectively.

Figure 9C:
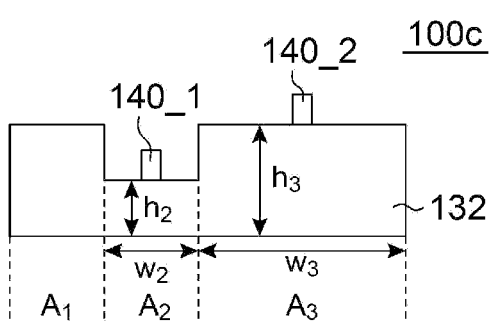
FIG. 9C is a simplified cross-sectional view of the multi-beam semiconductor laser device according to Variation Example.

FIG. 9C is an example in which the parameters (i) and (ii) are different. The multi-beam semiconductor laser device 100c in FIG. 9C represents the case of m=3 and n=2 and illustrates the three regions $A_1$ to $A_3$ and the two laser resonators 140_1 and 140_2. The regions $A_2$ and $A_3$ in which the laser resonators 140_1 and 140_2 are formed have the different heights $h_2$ and $h_3$, and the different widths $w_2$ and $w_3$, respectively.

Figure 9D:
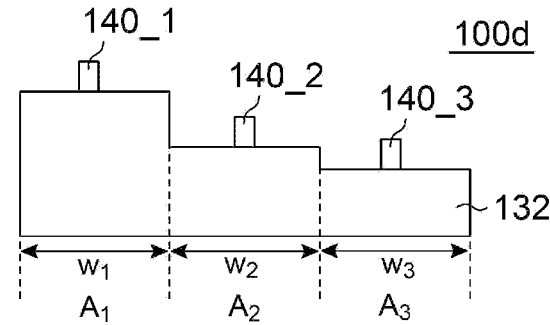
FIG. 9D is a simplified cross-sectional view of the multi-beam semiconductor laser device according to Variation Example.

FIG. 9D is an example in which the parameter (i) is different. The multi-beam semiconductor laser device 100d in FIG. 9D represents the case of m=3 and n=3 and illustrates the three regions $A_1$ to $A_3$ and the three laser resonators 140_1 to 140_3. The regions $A_1$ to $A_3$ in which the laser resonators 140_1 to 140_3 are formed have the different heights $h_1$ to $h_3$, respectively. In FIG. 9D, the regions $A_1$ to $A_3$ have the same widths $w_1$ to $w_3$; however, the widths $w_1$ to $w_3$ of the regions $A_1$ to $A_3$, i.e., the parameter (ii) may be different.

Figure 9E:
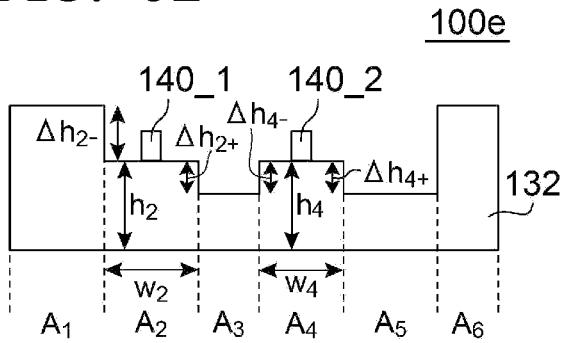
FIG. 9E is a simplified cross-sectional view of the multi-beam semiconductor laser device according to Variation Example.

FIG. 9E is an example in which the parameter (iii) is different. The multi-beam semiconductor laser device 100e in FIG. 9E represents the case of m=6 and n=2 and illustrates six regions $A_1$ to $A_6$ and the two laser resonators 140_1 and 140_2. The regions $A_2$ and $A_4$ in which the laser resonators 140_1 and 140_2 are formed have the same heights $h_2$ and $h_4$, and the same widths $w_2$ and $w_4$, respectively.

With respect to the region $A_2$, the difference in height between the region $A_2$ and the region $A_1$ expressed as $\Delta h_{2-}$ is negative, while the difference in height between the region $A_2$ and the region $A_3$ expressed as $\Delta h_{2+}$ is positive. With respect to the region $A_4$, the difference in height between the region $A_4$ and the region $A_3$ expressed as $\Delta h_{4-}$ is positive, while the difference in height between the region $A_4$ and the region $A_5$ expressed as $\Delta h_{4+}$ is positive. Hence, the region $A_2$ and the region $A_4$ have the different parameter (iii).

Figure 9F:
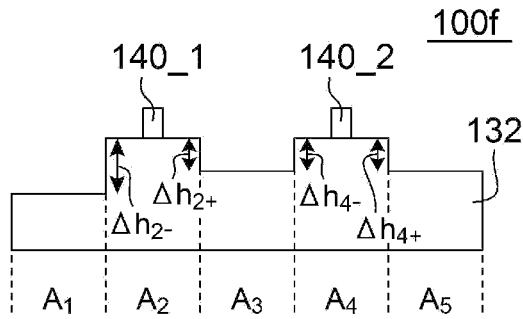
FIG. 9F is a simplified cross-sectional view of the multi-beam semiconductor laser device according to Variation Example.

FIG. 9F is also an example in which the parameter (iii) is different. The multi-beam semiconductor laser device 100f in FIG. 9F represents the case of m=5 and n=2 and illustrates the five regions $A_1$ to $A_5$ and the two laser resonators 140_1 and 140_2. The differences in height $\Delta h_{2-}$ and $\Delta h_{2+}$ are both positive with respect to the region $A_2$, and the differences in height $\Delta h_{4-}$ and $\Delta h_{4+}$ are both positive with respect to the region $A_4$. However, a pair of $\Delta h_{2-}$ and $\Delta h_{2+}$ has a value different from that of a pair of $\Delta h_{4-}$ and $\Delta h_{4+}$. Hence, the region $A_2$ and the region $A_4$ have the different parameter (iii).

Figure 9G:
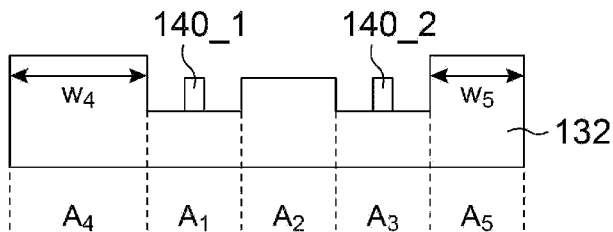
FIG. 9G is a simplified cross-sectional view of the multi-beam semiconductor laser device according to Variation Example.

FIG. 9G is an example in which the parameter (iv) is different. The multi-beam semiconductor laser device 100g in FIG. 9G represents the case of m=5 and n=2 and illustrates the five regions $A_1$ to $A_5$ and the two laser resonators 140_1 and 140_2. The regions $A_1$ and $A_3$ in which the laser resonators 140_1 and 140_2 are formed have the same height and the same width. The difference in deposition rates between the regions $A_1$ and $A_3$ results from the difference between the width $w_4$ of the adjacent region $A_4$ on the left with respect to the region $A_1$ and the width $w_5$ of the adjacent region $A_5$ on the right with respect to the region $A_3$.

Those skilled in the art can understand that various variation examples are not illustrated here in terms of the cross-sectional shape of the base structure 132 and the arrangement of the laser resonator 140. These variation examples are also included in the scope of the present disclosure and invention.

Variation Example 2

With respect to the multi-beam semiconductor laser device 100A according to Example 1, it is described that the leaked light from the laser resonator 140 formed in the concave portion is shielded by the substrate 110 having the convex portion. This light-shielding function may be achieved by a member different from the substrate 110 having the convex portion.

Figure 10:
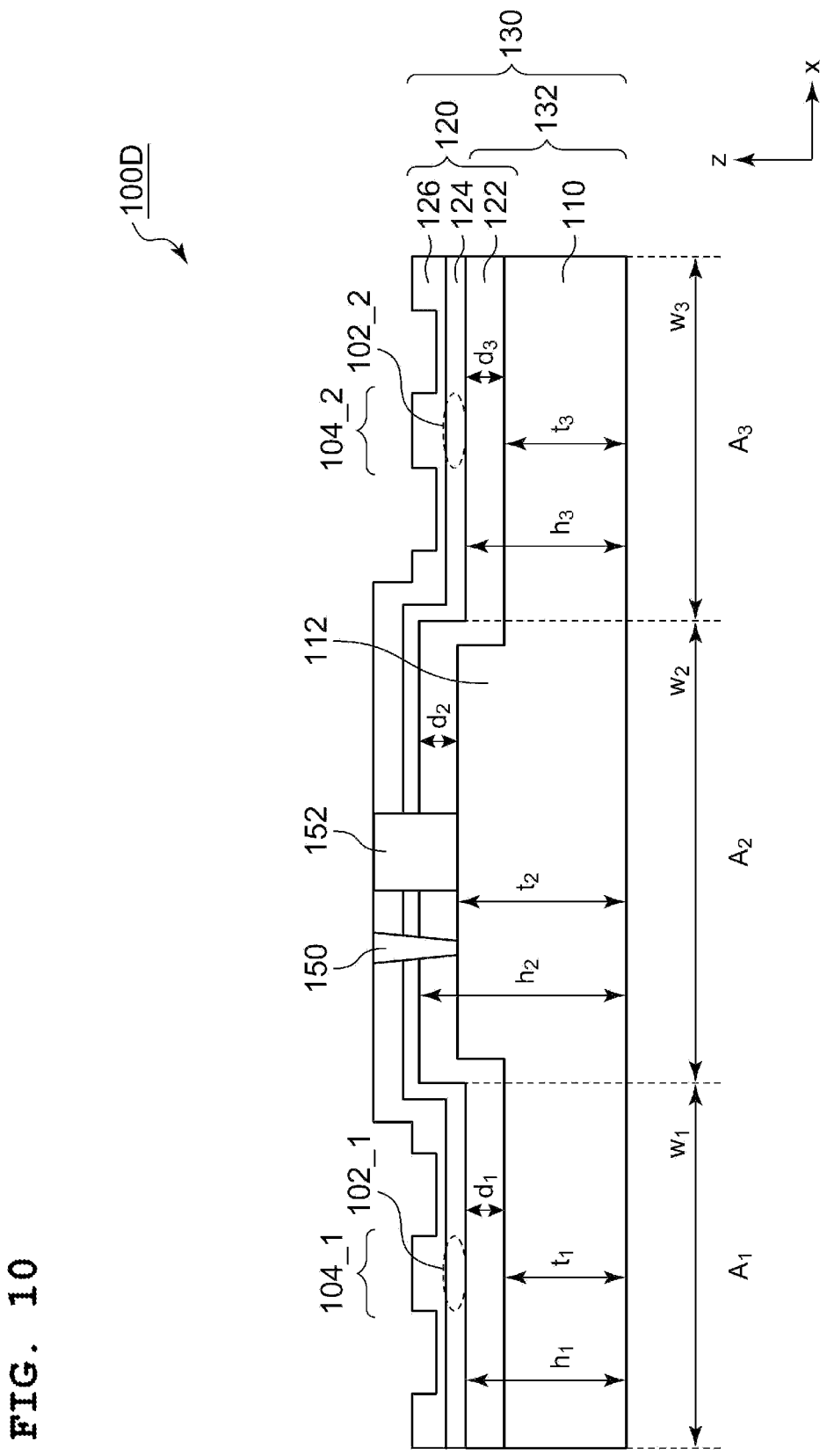
FIG. 10 is a cross-sectional view of a multi-beam semiconductor laser device according to Variation Example 2.

FIG. 10 is a cross-sectional view of a multi-beam semiconductor laser device 100D according to Variation Example 2. The multi-beam semiconductor laser device 100D is provided with a light-shielding member 152 located between the adjacent laser resonators 140_1 and 140_2. The light-shielding member 152 can be made of a material including semiconductor or metal that absorbs light having the oscillation wavelength of the laser resonator 140. The lower end of the light-shielding member 152 preferably reaches at least the lower end of the light-emitting layer 124 in order to suppress optical crosstalk between the two laser resonators 140_1 and 140_2. In the present Variation Example 2, the lower end of the light-shielding member 152 penetrates the n-type cladding layer 122 and reaches the upper surface of the convex portion 112.

As shown in FIG. 10, the light-shielding member 152 is particularly effective when the substrate 110 has a small unevenness and the convex portion 112 of the substrate 110 does not absorb the leaked light from the adjacent laser resonators 140_1 and 140_2.

Variation Example 3

In Examples 1 to 3, the separation groove 150 may be omitted when there is no need for the plurality of laser resonators 140 to be operated independently.

Variation Example 4

The embodiments and several Examples and Variation Examples described above have focused on multi-beams with multiple wavelengths, but the multiple wavelengths are not essential to the present disclosure; the scope of the present disclosure or invention can include even the case in which all beams have the same wavelength. In the case of $w_1=w_3$ and $h_1=h_3$ in FIG. 2 (Example 1), for example, it comes to $\lambda_1=\lambda_2$. Alternatively, even in the case of $w_1 \neq w_3$ and $h_1 \neq h_3$, it can come to $\lambda_1 \approx \lambda_2$ if $w_1$ and $w_3$ are sufficiently large. In this case, the first advantage described in Example 1 is lost, but at least one of the second, third, and fourth advantages still remains to be served, providing advantages over the conventional technology.

The embodiments merely show the principles and applications of the present disclosure or invention, and many variation examples and modifications in the arrangement are allowed for the present embodiment to the extent that they do not depart from the idea of the disclosure or invention stipulated in the scope of the claims.

What is claimed is:

1. A multi-beam semiconductor laser device that is an edge-emitting multi-beam semiconductor laser device, the multi-beam semiconductor laser device comprising:
    a layered structure including a substrate, a first conductive cladding layer, a light-emitting layer, and a second conductive cladding layer,
    wherein the layered structure has m regions (m>2) including a first m region, a second m region and a third m region that are adjacent in a first direction, and a sum of a first height of the substrate and a second height of the first conductive cladding layer is different in each of the m regions, the first height and the second height having a positive value,
    and wherein n laser resonators ($2 \leq n < m$) each having a ridge stripe structure extending in a second direction orthogonal to the first direction are formed in the n regions among the m regions, the second m regions lacking the ridge stripe structure and being located between the first m region and the third m region,
    and wherein at least two of the n laser resonators have different oscillation wavelengths among the n laser resonators.

2. The multi-beam semiconductor laser device according to claim 1, wherein the substrate has a different thickness in each of the m regions.

3. The multi-beam semiconductor laser device according to claim 2, wherein the m regions include the first m region, the second m region, and the third m region that are adjacent in this order,
    and wherein the thickness of the substrate in the second m region is greater than the thickness of the substrate in the first m region and the thickness of the substrate in the third m region,
    and wherein the laser resonator is formed in each of the first m region and the third m region.

4. The multi-beam semiconductor laser device according to claim 1, wherein the light-emitting layers in the first m region and the light-emitting layer in the third m region are located at a lower height than a front surface of the substrate in the second m region.

5. The multi-beam semiconductor laser device according to claim 4, wherein the substrate is made of a material that absorbs light having the oscillation wavelength of the laser resonator.

6. The multi-beam semiconductor laser device according to claim 5, wherein the substrate includes GaAs when the oscillation wavelength of the laser resonator is in the range of 580 to 900 nm, and includes GaN when the oscillation wavelength is 360 nm or lower.

7. The multi-beam semiconductor laser device according to claim 1, wherein the thickness of the substrate in the first m region is different from the thickness of the substrate in the third m region.

8. The multi-beam semiconductor laser device according to claim 1, wherein the m regions further includes a fourth m region that is disposed opposite to the second m region with respect to the first m region and adjacent to the first m region, and a fifth m region that is disposed opposite to the second m region with respect to the third m region and adjacent to the third m region, and wherein the width of the first n region is different from the width of the third m region.

9. The multi-beam semiconductor laser device according to claim 1, wherein the oscillation wavelength of the laser resonator in the second m region is longer than the oscillation wavelengths of the laser resonators in the first m region and the third region.

10. The multi-beam semiconductor laser device according to claim 1, wherein the first conductive cladding layer has a different thickness in each of the m regions.

11. The multi-beam semiconductor laser device according to claim 1, wherein the second m region is formed with a separation groove extending in the second direction.

12. The multi-beam semiconductor laser device according to claim 1, wherein a semiconductor or a piece of metal that absorbs light having the oscillation wavelength of the laser resonator is disposed between the laser resonators adjacent to each other.

13. A method of manufacturing an edge-emitting multi-beam semiconductor laser device, the method comprising:
    forming a base structure including a substrate having a first thickness and a first conductive cladding layer having a second thickness, the first thickness and the second thickness having a positive value, the base structure having a different thickness in each of m regions ($m \geq 2$) adjacent in a first direction;
    forming a light-emitting layer and a second conductive cladding layer on the base structure; and
    forming n laser resonators each having a ridge stripe structure extending in a second direction orthogonal to the first direction in n regions of the m regions ($2 \leq n \leq m$).

14. The method of manufacturing according to claim 13, wherein forming the base structure includes forming a groove extending in the second direction on the substrate, and forming the first conductive cladding layer on the substrate on which the groove has been formed.

15. The method of manufacturing according to claim 14, wherein forming the groove includes forming the plurality of grooves having different widths.

16. A multi-beam semiconductor laser device that is an edge-emitting multi-beam semiconductor laser device, the multi-beam semiconductor laser device comprising:
    a layered structure including a substrate, a first conductive cladding layer, a light-emitting layer, and a second conductive cladding layer,
    wherein the layered structure has m regions (m>2) that are adjacent in a first direction, and a sum of a first height of the substrate and a second height of the first conductive cladding layer is different in each of the m regions, the first height and the second height having a positive value,
    and wherein each of the m regions has a laser resonator having an emitter in a ridge stripe structure extending in a second direction orthogonal to the first direction are formed in each of the m regions,
    wherein at least two of the n laser resonators have different oscillation wavelengths among the n laser resonators.

17. The multi-beam semiconductor laser device according to claim 16, wherein and wherein the thickness of the substrate in the second m region is greater than the thickness of the substrate in the first m region.

18. The multi-beam semiconductor laser device according to claim 16, wherein the substrate includes GaAs when the oscillation wavelength of one of the laser resonators is in the range of 580 nm to 900 nm, and includes GaN when the oscillation wavelength is 360 nm or lower.

19. The multi-beam semiconductor laser device according to claim 16, wherein the oscillation wavelength of one of the laser resonators in the second region is longer than the oscillation wavelengths of another one of the laser resonators in the first region.

* * * * *